US010237335B2

(12) United States Patent
Piga

(10) Patent No.: US 10,237,335 B2
(45) Date of Patent: Mar. 19, 2019

(54) MANAGING CLUSTER-LEVEL PERFORMANCE VARIABILITY WITHOUT A CENTRALIZED CONTROLLER

(71) Applicant: Advanced Micro Devices, Inc., Sunnyvale, CA (US)

(72) Inventor: Leonardo Piga, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 303 days.

(21) Appl. No.: 15/183,625

(22) Filed: Jun. 15, 2016

(65) Prior Publication Data

US 2017/0366412 A1 Dec. 21, 2017

(51) Int. Cl.
*G06F 9/00* (2006.01)
*H04L 29/08* (2006.01)

(52) U.S. Cl.
CPC ................ *H04L 67/10* (2013.01); *G06F 9/00* (2013.01); *H04L 67/1008* (2013.01); *H04L 67/1029* (2013.01); *H04L 67/28* (2013.01)

(58) Field of Classification Search
CPC ....... H04L 49/109; H04L 41/14; H04L 47/70; H04L 67/10; H04L 29/08; G06F 9/00
See application file for complete search history.

(56) References Cited

U.S. PATENT DOCUMENTS 5,974,424 A * 10/1999 Schmuck .......... G06F 17/30224
6,023,706 A * 2/2000 Schmuck .......... G06F 17/30224
8,190,714 B2 * 5/2012 Davidson .............. G06F 9/4416 707/999.001
9,614,926 B2 * 4/2017 Gunda ................ H04L 67/2842
9,665,404 B2 * 5/2017 Hu ........................ G06F 9/5072
9,672,064 B2 * 6/2017 Gupta ....................... G06F 9/48
2013/0104140 A1 * 4/2013 Meng .................... G06F 9/4881 718/104

(Continued)

OTHER PUBLICATIONS

Etinski et al., "Optimizing Job Performance Under a Given Power Constraint in HPC Centers", Proceedings of the International Conference on Green Computing, Aug. 2010, pp. 257-267, IEEE Computer Society, Washington D.C., USA.

(Continued)

*Primary Examiner* — Sargon N Nano
(74) *Attorney, Agent, or Firm* — Meyertons Hood Kivlin Kowert and Goetzel PC; Rory D. Rankin

(57) ABSTRACT

Systems, apparatuses, and methods for managing cluster-level performance variability without a centralized controller are described. Each node of a multi-node cluster tracks a maximum and minimum progress across the plurality of nodes for a workload executed by the cluster. Each node also tracks its local progress on its current task. Each node also utilizes a comparison of the local progress to reported maximum and minimum progress across the cluster to identify a critical, or slow, node and whether to increase or reduce an amount of power allocated to the node. The nodes append information about the maximum and minimum progress to messages sent to other nodes to report their knowledge of maximum and minimum progress with other nodes. A node updates its local information if the node receives a message from another node with more up-to-date information about the state of progress across the cluster.

17 Claims, 10 Drawing Sheets

900

905 Maintain, by a 1st Node, Maximum and Minimum Progress Indications for a Workload in a Plurality of Nodes 910 Track a Local Progress of the 1st Node on a Current Task 915 Receive a Progress Report from a 2nd Node 920 Compare the Reported Progress Information to the Local Progress 925 Both Nodes Identify same node as Critical? Yes / No 930 Minimum Progress in 2nd Node > Minimum Progress in 1st Node? Yes / No 935 Copy the Reported Minimum Progress from 2nd Node to the Minimum Progress in the 1st Node 940 Minimum Progress in 1st Table > Minimum Progress in 2nd Table? Yes / No 945 Copy the Reported Minimum Progress and the Critical Node from the 2nd Node to the First Node 950 Maximum Progress in 2nd Node > Maximum Progress in 1st Node? Yes / No 955 Copy the Reported Maximum Progress and the Fastest Node from the 2nd Node to the 1st Node 960 Leave the Maximum Progress and Fastest Node in the 1st Node Unchanged

(56) References Cited

U.S. PATENT DOCUMENTS

| | | | | |
|---|---|---|---|---|
| 2013/0173512 | A1* | 7/2013 | Cantin | G06N 3/12 706/13 |
| 2014/0047342 | A1* | 2/2014 | Breternitz | G06F 9/5061 715/735 |
| 2015/0046380 | A1* | 2/2015 | Cantin | G06N 3/126 706/13 |
| 2015/0150017 | A1* | 5/2015 | Hu | G06F 12/00 718/103 |
| 2016/0048415 | A1* | 2/2016 | Sarma | G06F 9/5083 718/104 |
| 2016/0358249 | A1* | 12/2016 | Iyer | G06Q 30/08 |

OTHER PUBLICATIONS

Demers, et al., "Epidemic Algorithms for Replicated Database Maintenance", Jan. 1989, 28 pages, ACM, New York, NY, USA.

Kempe, et al., "Gossip-Based Computation of Aggregate Information", Proceedings of the 44th Annual IEEE Symposium on Foundations of Computer Science, Oct. 11, 2003, 10 pages, IEEE Computer Society, Washington, DC, USA.

* cited by examiner

Table 400

| Task ID | Minimum Progress | Critical Node | Minimum Progress Timestamp | Maximum Progress | Fastest Node | Maximum Progress Timestamp |
|---|---|---|---|---|---|---|
| 0x0024 | $P_{min}$ | Node C | 2016-03-28 13:40:09 | $P_{max}$ | Node F | 2016-03-28 13:42:57 |

```
// Update Local Information on Maximum and Minimum Progress in System

if ((current_progress>min_progress) and (nodeID == critical_node))
{
     min_progress = current_progress
}

if (current_progress>max_progress)
{
     fastest_node = nodeID
     max_progress = current_progress
}
```

```
Exchange_progresses()
{
      // Form a group of nodes S by randomly selecting  g nodes.
   S = random_select(g)
      // Set the variable A equal to the node currently being considered.
   A = current_node

   FOR each node B in the group of nodes S
   {
      IF (A.critical_node == B.critical_node)
      {       // If the node identified by node A as the critical node is the same identified by node B,
              // Then choose the greater of the minimum progress for nodes A and B and set it as the
              // minimum progress for both nodes.
         A.min_progress = max (A.min_progress, B.min_progress)
         B.min_progress = max (A.min_progress, B.min_progress)
      }

      // Synchronize Minimum Progress between nodes A and B.
      IF(A.min_progress <= B.min_progress)
      {
         B.min_progress = A.min_progress
         B.critical_node = A.critical_node
      }
      ELSE
      {
         A.min_progress = B.min_progress
         A.critical_node = B.critical_node
      }

      // Synchronize Maximum Progress between nodes A and B.
      IF(A.max_progress >= B.max_progress)
      {
         B.max_progress = A.max_progress
         B.fastest_node = A.fastest_node
      }
      ELSE
      {
         A.max_progress = B.max_progress
         A.fastest_node = B.fastest_node
      }

   }  // End FOR

}     // End Exchange_progresses()
```

FIG. 6

MANAGING CLUSTER-LEVEL PERFORMANCE VARIABILITY WITHOUT A CENTRALIZED CONTROLLER

The invention described herein was made with government support under contract number DE-AC02-05CH11231 awarded by the United States Department of Energy. The United States Government has certain rights in the invention.

BACKGROUND

Technical Field

Embodiments described herein relate to processing devices and more particularly, to achieving balanced execution in a multi-node cluster using run-time detection of performance variation.

Description of the Related Art

Parallel computing is the simultaneous execution of the same application or workload using multiple processing elements (e.g., nodes in a multi-node cluster) in order to obtain results faster. A parallel workload can be split up to be executed a piece at a time on many different nodes, and then put back together again at the end to get a data processing result. Often applications with multiple tasks executing concurrently may complete at different times, leading to significant levels of performance variation across a large scale system, with the nodes that finished early wasting power while waiting for other nodes to finish their tasks in the presence of dependencies such as synchronization barriers. Accordingly, the overall progress of the application is limited by the slowest tasks of the system. Performance variation can be caused by process differences among multiple processors, operating system noise, resource contention, and/or other factors. High performance computing (HPC) applications are often tightly synchronized and massively parallel, and thus performance variation on even a small subset of the system can lead to large amounts of wasted power and lost performance. One of the many challenges in scaling parallel applications in future extreme scale systems will be managing performance variation across the many nodes of the system.

SUMMARY

Systems, apparatuses, and methods for managing cluster-level performance variability without a centralized controller are contemplated.

In one embodiment, each node of a multi-node cluster tracks a maximum and minimum progress across the plurality of nodes for a current phase of a workload being executed by the cluster. Each node also tracks a local progress of the node on its current task. Each node utilizes a comparison of the local progress to the maximum and the minimum progress across the cluster to determine whether to increase or reduce an amount of power allocated to the node. The nodes include information about the maximum and minimum progress in messages sent to other nodes to report cluster progress to other nodes. A node updates its local information if the node receives a message from another node with more up-to-date information about the state of progress across the cluster. Nodes also send the maximum and minimum progress to randomly selected nodes to allow up-to-date information to spread throughout the cluster.

In one embodiment, each node maintains a table of the maximum and the minimum progress across the plurality of nodes, with the table identifying a fastest node and a slowest node of the plurality of nodes for the current phase of the workload. Different nodes have different information based on the rate at which messages about the maximum and minimum progress are passed throughout the cluster. However, over time, as messages are passed between the nodes with the information from local tables, the tables of the nodes of the cluster converge to the same maximum and minimum values.

In one embodiment, each node is configured to compare its local progress with the maximum and minimum progress of the cluster. A node is configured to increase an amount of power allocated to the node responsive to determining a local progress of the node is within a first threshold of the minimum progress. Additionally, a node is configured to decrease an amount of power allocated to the node responsive to determining a local progress of the node is within a second threshold of the maximum progress.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates one embodiment of a table of maximum and minimum progress across a cluster.

FIG. 5 illustrates one embodiment of sample code which is executed by a node.

FIG. 6 illustrates one embodiment of sample code which is executed by a node.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
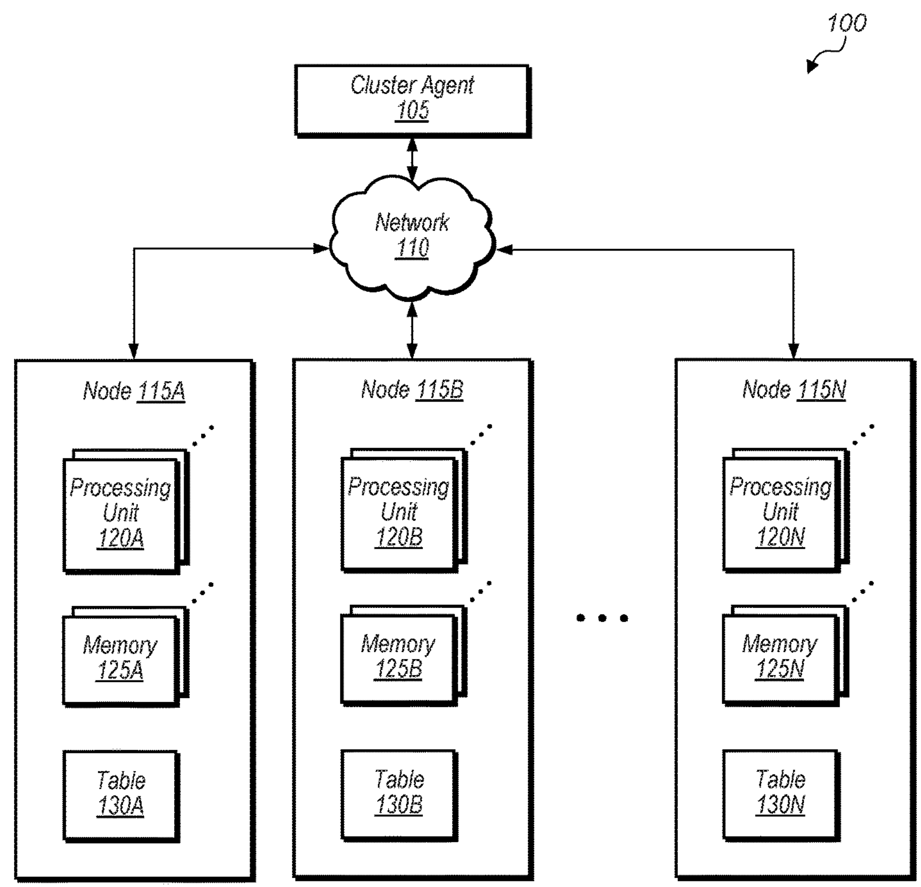
FIG. 1 is a block diagram of one embodiment of a computing system.

Referring now to FIG. 1, a block diagram illustrating one embodiment of a computing system 100 is shown. As shown in FIG. 1, system 100 includes cluster agent 105, network 110, and nodes 115A-N, which are representative of any number and type of compute nodes. In various embodiments, system 100 is used to process and store data, perform computational tasks, and transmit data to other devices and systems using network 110 or another network. In one embodiment, system 100 performs data processing on large datasets. For example, system 100 is configured to execute any of various types of workloads (e.g., parallel processing applications, MapReduce operations, simulations, modeling applications) depending on the embodiment.

Node 115A includes one or more processing units 120A, one or more memories 125A, and table 130A. Similarly, nodes 115B and 115N include one or more processing units 120B and 120N, one or more memories 125B and 125N, and tables 130B and 130N, respectively. Tables 130A-N are representative of a table for storing the maximum and minimum progress of nodes across the cluster for the current phase of a workload. It is noted that while tables are used herein for purposes of discussion, any suitable data structure is used for storing, managing, and sharing progress information.

Generally speaking, a node 115A-N is defined as an apparatus or system with at least one computing/processing element (e.g., processor, processor core, programmable logic device, application specific integrated circuit) and at least one memory device. The at least one computing element of the node is configured to execute instructions and/or perform one or more types of computations (e.g., floating point, integer, memory, I/O) depending on the embodiment. The components of each node 115A-N are interconnected by one or more communication buses. Processing units 120A-N are representative of any number and any type of processing element (e.g., CPU, GPU, processor core, accelerated processing unit (APU)). Processing units 120A-N have any number and type of caches (e.g., L1 cache, L2 cache). Processing units 120A-N are configured to execute instructions concurrently or in parallel.

Various types of memories 125A-N are utilized in nodes 115A-N, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc.

In various embodiments, network 110 includes any number and type of networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Network 110 may also represent any type of wired or wireless connection medium. For example, wired mediums include Ethernet, fiber channel, etc. Wireless connection mediums include a wireless connection using a wireless communication protocol such as IEEE 802.11, a modem link through a cellular service, a satellite link, etc.

In one embodiment, cluster agent 105 utilizes a single program multiple data (SPMD) paradigm to map tasks to different nodes 115A-N. In various embodiments, cluster agent 105 is implemented using any suitable combination of hardware and/or software. System 100 attempts to minimize the synchronization wait time across the cluster by adjusting power allocated to nodes based on whether the nodes are ahead of schedule or behind schedule as compared to the other nodes of the cluster.

One of the many challenges in scaling parallel applications is managing performance variation across the many nodes 115A-N of system 100. Performance variation is problematic for high-performance computing (HPC) applications that are tightly synchronized, in which the overall progress of the application is limited by the slowest tasks/processes in the system. Unbalanced workload distribution, resource contention, operating system jitter/noise, and process variation in the underlying microarchitecture are each likely to contribute to variation in the system 100.

In one embodiment, system 100 utilizes a distributed scheme to track the progress of tasks among the nodes 115A-N of the system 100. For example, each node 115A-N tracks the minimum and the maximum progress across system 100 in tables 130A-N together with the respective node information. The statistics are updated when a node sends a communication message to another node. In one embodiment, a node appends metadata containing its own progress and what it has determined (what it "knows") regarding the minimum and maximum progress of all of the nodes 115A-N. Once a node receives a communication message, the node extracts the knowledge of the sender about the progress of the nodes and update its local information. In various embodiments, nodes 115A-N randomly selects a subset of nodes with which to exchange knowledge about the minimum and the maximum progress. In other embodiments, system 100 is partitioned into regions, with nodes 115A-N sharing messages with other predetermined nodes in their region. In such embodiments, various partitions overlap such that information regarding progress feeds into other partitions. In this manner, progress information may encompass a larger region and potentially include all nodes. In another embodiment, a node sends messages about minimum and maximum progress with nodes that are their immediate neighbors.

A node tracks its own progress on its task and compare this progress to the maximum and minimum progress of system 100. Depending on the embodiment, a node calculates its own progress in a variety of different ways. In one embodiment, nodes 115A-N are executing message passing interface (MPI) applications. MPI applications are characterized by collective and point-to-point messages. A very fine grain of progress in this type of application is defined as the number of operations (in a single rank or process) that are left to reach the next collective operation. The total number of operations can be specified by a user or can be discovered based on an average case. In another embodiment, a parallel application executes a number of simulation steps on each node before reaching a synchronization barrier. In this embodiment, a node tracks (automatically or with user help) the percentage of a task remaining to reach the next synchronization barrier. In a further embodiment, a node uses performance counters to track the progress based on regression models or average cases. For automatic cases, a node utilizes a prediction mechanism to predict an amount of progress already achieved. One type of prediction mechanism is history based. For MPI applications, a node uses the number of operations needed to complete a previous task to predict the number of operations needed to complete the current task. Other techniques for tracking progress by a node are possible and are contemplated.

Figure 2:
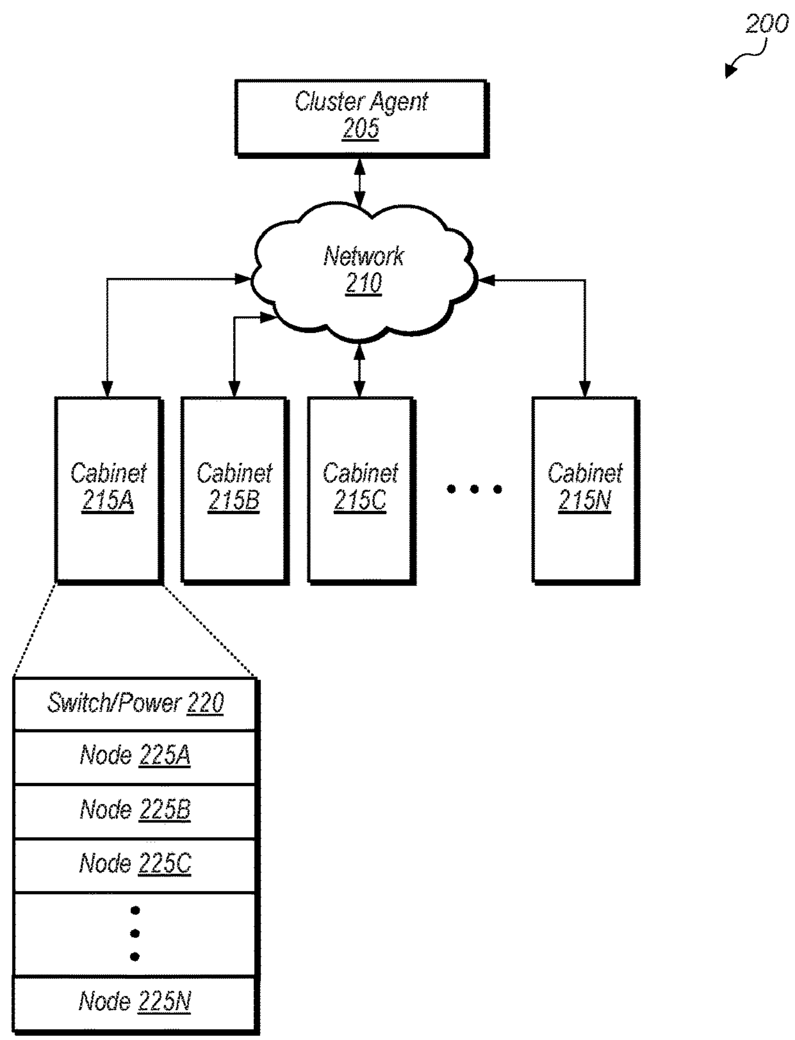
FIG. 2 is a block diagram of another embodiment of a computing system.

Turning now to FIG. 2, a block diagram illustrating another embodiment of a computing system 200 is shown. As shown in FIG. 2, system 200 includes cluster agent 205, network 210, and cabinets 215A-N. Each cabinet of cabinets 215A-N includes a plurality of nodes. In various embodiments, system 200 is used to process and store data, perform computational tasks, and transmit data to other devices and systems using network 210 or another network. In one embodiment, system 200 performs data processing on large datasets. For example, system 200 is configured to execute any of various types of workloads (e.g., parallel processing applications, MapReduce operations, simulations, modeling applications) depending on the embodiment. System 200 is also be configured to work in various types of power constrained environments where the total amount of power allowed to be consumed by system 200 is capped. It is noted that system 200 may also be referred to as a supercomputer, data center, cluster, high performance computing (HPC) cluster, or cloud computing cluster.

As shown in FIG. 2, cabinet 215A includes switch/power unit 220 and nodes 225A-N, which are representative of any number and type of nodes. In one embodiment, cluster agent 205 is configured to manage the assignment of tasks to nodes and/or perform other management functions. In one embodiment, cluster agent 205 is implemented on one or more of the nodes of cabinets 215A-N. In another embodiment, cluster agent 205 is implemented separately from cabinets 215A-N in system 200. The nodes within each cabinet 215A-N are interconnected to one another through a switch (e.g., switch/power unit 220) and the cabinets 215A-N within system 200 may also be interconnected through a switch (not shown). The switch/power unit 220 is also be configured to provide power to the nodes of cabinet 215A. Alternatively, in another embodiment, there are separate switch and power units, with power being provided to nodes 225A-N via a backplane or other mechanism. In some embodiments, there are multiple switches and/or power units per cabinet.

Figure 3:
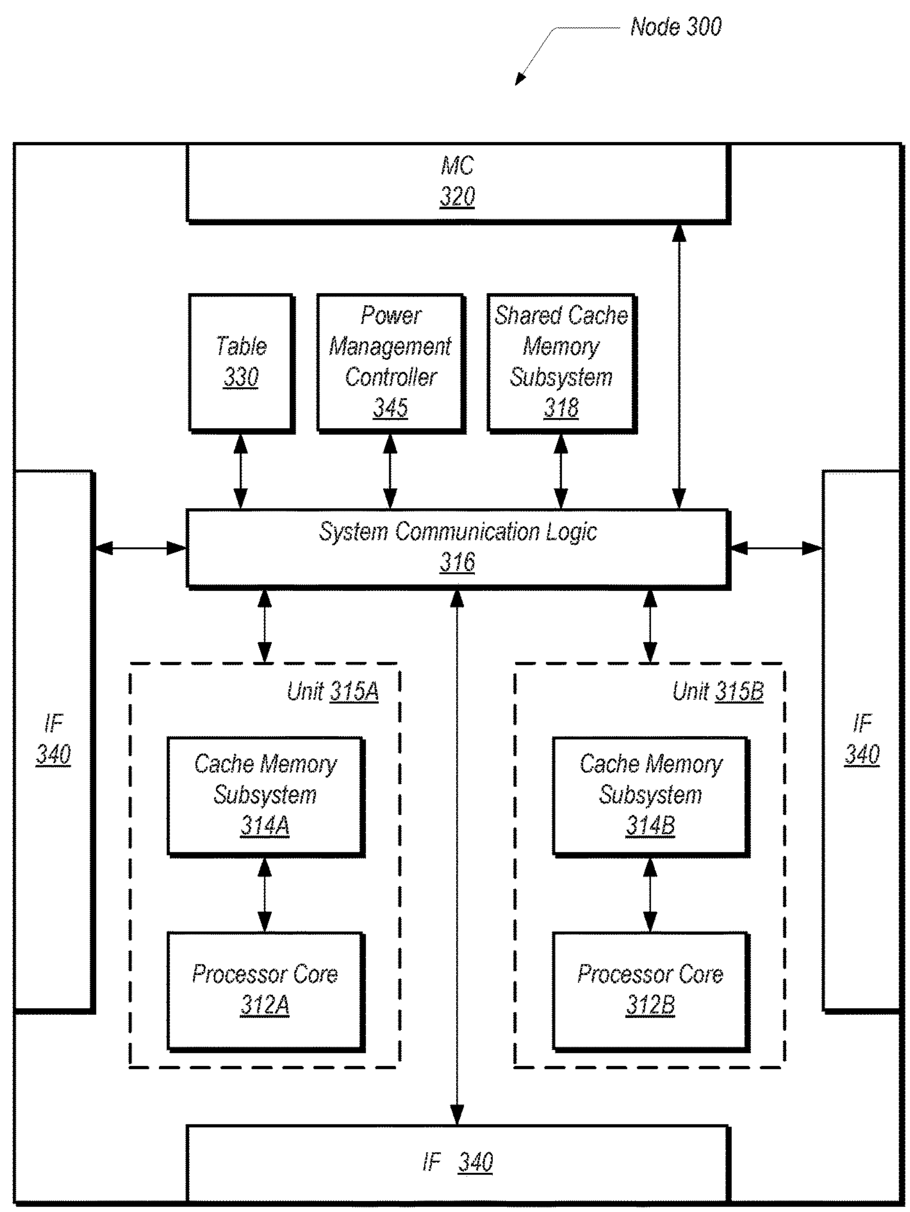
FIG. 3 is a block diagram of one embodiment of a node.

Referring now to FIG. 3, a block diagram of one embodiment of a node 300 is shown. The components of node 300 are included within each node of nodes 115A-N (of FIG. 1) or nodes 225A-N (of FIG. 2). Node 300 includes memory controller (MC) 320, interface logic 340, one or more processing units 315A-315B, which includes processor cores 312A-312B and corresponding cache memory subsystems 314A-314B, system communication logic 316, table 330, power management controller 345, and a shared cache memory subsystem 318. In one embodiment, the illustrated functionality of node 300 is incorporated into a single integrated circuit. In another embodiment, the illustrated functionality is incorporated in a chipset on a computer motherboard.

In one embodiment, node 300 is a stand-alone system within a mobile computer, a desktop, a server, or other device or system. In other embodiments, node 300 is one node within a socket of a multi-socket system. In some embodiments, the processing units 315A-315B and one or more other sources outside of node 300 access the shared cache memory subsystem 318. The other sources include general-purpose processors and graphics processing units (GPUs) on other nodes, input/output (I/O) devices, and so forth. In other embodiments, another level of cache, such as caches 314A-314B, in the cache memory hierarchy are shared by multiple sources.

Table 330 stores a snapshot of the maximum and minimum progress across a multi-node cluster for a given phase of a parallel application. Power management controller 345 is configured to reconfigure the hardware of node 300 (through dynamic voltage and frequency scaling (DVFS) or changing any other parameters such as number of cores, memory bandwidth, cache size, etc.) based on a comparison of local progress of node 300 with the maximum and minimum progress of the multi-node cluster. For example, power management controller 345 is configured to reduce voltage or frequency supplied to the processors of the node, shutdown one or more cores, shutdown one or more memory banks, and/or shutdown one or more memory controllers if node 300 is ahead of schedule as compared to the other nodes.

Processor cores 312A-312B include circuitry for executing instructions according to a predefined instruction set. Although two processor cores 312A-312B are shown in FIG. 3, in another embodiment, node 300 includes another number of processor cores, such as a single processor core, four processor cores, and so forth. Generally, processor cores 312A-312B access the cache memory subsystems 314A-314B, respectively, for data and instructions.

Cache memory subsystems 314A-314B and 318 comprise high-speed cache memories or arrays configured to store blocks of data. Cache memory subsystems 314A-314B are implemented as a hierarchy of caches. In one embodiment, cache memory subsystems 314A-314B each represent L2 cache structures, and shared cache memory subsystem 318 represents an L3 cache structure. An L1 cache structure is integrated within each of the processor cores 312A-312B. Other embodiments are possible and are contemplated.

Memory controller 320 is used to connect the node 300 to off-die memory. Memory controller 320 may comprise control circuitry for interfacing to memories. Memory controller 320 follows memory channel protocols for determining values used for information transfer, such as a number of data transfers per clock cycle, signal voltage levels, signal timings, signal and clock phases and clock frequencies. Additionally, memory controller 320 includes request queues for queuing memory requests. The off-die memory includes one of multiple types of dynamic random access memories (DRAMs). The DRAM is further connected to lower levels of a memory hierarchy, such as a disk memory and offline archive memory.

The interface 340 includes integrated channel circuitry to directly link signals to other processing nodes, which include another processor. The interface 340 utilizes one or more coherence links for inter-node access of processor on-die caches and off-die memory of another processing node. Examples of the technology include HyperTransport and QuickPath. The interface 340 generally provides an interface for input/output (I/O) devices off the node 300 to the shared cache memory subsystem 318 and processing units 315A-315B. I/O devices include many variations of computer peripheral devices.

In one embodiment, system communication logic 316 is a system bus. In another embodiment, node 300 incorporates a Northbridge system bus controller in logic 316 in order to couple processing units 315A-315B to an off-chip memory, I/O devices, other off-chip processors such as a graphics processing unit (GPU), another type of single-instruction-multiple-data (SIMD) core, a digital signal processor (DSP), other general-purpose processors, and so forth. In such an embodiment, system communication logic 316 replaces or incorporates the functionality of memory controller 320 and interface logic 340.

In one embodiment, system communication logic 316 incorporates both a Northbridge and a Southbridge system bus controller. A Northbridge protocol is used to couple processing units 315A-315B to off-chip memory and a GPU. A Southbridge protocol is used to couple processing units 315A-315B to I/O devices, a real time clock, a power management unit, or other components. One example of such an embodiment of logic 316 includes the AMD-762™ Northbridge system controller and the AMID-768™ Southbridge peripheral bus controller.

In yet another embodiment, node 300 is one socket of a multi-socket system. System communication logic 316 incorporates packet-processing logic in such an embodiment. Generally speaking, system communication logic 316 is configured to respond to control packets received on the links to which the node 300 is coupled, to generate control packets in response to processor cores 312A-312B and/or cache memory subsystems 314A-314B, to generate probe commands and response packets in response to transactions selected by the memory controller 320 for service, and to route packets for which node 300 is an intermediate node to other nodes through interface logic 340. Interface logic 340 includes logic to receive packets and synchronize the packets to an internal clock used by packet processing logic within logic 316.

Turning now to FIG. 4, one embodiment of a table 400 for storing a maximum and minimum progress across a multi-node cluster is shown. In various embodiments, a critical node is defined as a node identified as having a least amount of progress on a given task. A fastest node is defined as a node identified as having the most progress on a given task. Table 400 includes an entry to track the progress of the nodes across the cluster. In other embodiments, table 400 includes multiple entries for multiple tasks. The entry in table 400 includes a task ID field to identify the current task being performed by the node.

The entry in table 400 includes a minimum progress field, which is shown as $P_{min}$ in table 400. In one embodiment, $P_{min}$ is represented as a percentage of the current task which has been completed, while in other embodiments, $P_{min}$ is specified using other metrics. The entry in table 400 also identifies a critical node that was identified as having the least amount of progress specified in its minimum progress field. For the entry shown in table 400, the critical node is identified as "Node C". The entry in table 400 also includes a minimum progress timestamp to indicate the time when the minimum progress was last updated.

The entry in table 400 also includes a maximum progress field which is shown as $P_{max}$. The entry in table 400 also identifies the fastest node that has made the amount of progress specified in the maximum progress field. For the entry shown in table 400, the fastest node is identified as "Node F". The entry in table 400 also includes a maximum progress timestamp to indicate the time when the maximum progress was last updated.

It is noted that in other embodiments, table 400 is structured differently, includes one or more other fields not shown in FIG. 4, and/or omits one or more of the fields shown in FIG. 4. For example, table 400 also includes a field for a minimum progress threshold which specifies the cut-off point for a node to increase its power allocation if the node's current progress is less than the minimum progress threshold. The minimum progress threshold is calculated by adding a threshold to the minimum progress field of table 400. In another embodiment, table 400 also includes a maximum progress threshold which specifies that cut-off point for a node to decrease its power allocation if its progress is greater than the maximum progress threshold.

In one embodiment, each node compares a measure of the local progress of the node ($P_{local}$) to the maximum and minimum progress stored in table 400. If the node falls too far behind the maximum progress, then the node increases the power allocated to the node so that the node can catch up to the other nodes. In one embodiment, the node subtracts a threshold amount from the maximum progress and compare $P_{local}$ to this amount. If $P_{local}$ is less than the threshold amount subtracted from the maximum progress, then the node increases it power allocation. Alternatively, in another embodiment, the node compares $P_{local}$ to a threshold amount added to the minimum progress $P_{min}$. If $P_{local}$ is less than the sum of the threshold amount added to the minimum progress $P_{min}$, then the node increases its power allocation. Otherwise, the node maintains its current power allocation.

In one embodiment, on a predefined timer interval, a node updates its own table to reflect its current state and its knowledge about minimum and maximum progress. Then, the node selects a group of nodes to exchange its knowledge. Selecting the group of nodes are at random, or the group of nodes could be predetermined. For example, the group of nodes corresponds to a given physical location (region or partition) of a system or chip. Alternatively, nodes are partitioned on a logical (not necessarily physical) basis. The pseudo-code in FIG. 5 illustrates one example of code that is used by a node to update its own table. FIG. 6 shows the pseudo-code for one example of code that is used to implement the progress exchange phase. In one embodiment, each node appends additional data/information to other regular communication messages sent to other nodes. On point-to-point messages, a node updates its local information and append the up-to-date progress information to the message. On receiving a message, a node extracts the added data and update its local information.

After exchanging progress information, a local power management algorithm determines whether the local node is ahead or behind of the progress of the other nodes and changes the hardware configuration of the local node in order to either increase performance or decrease performance of the node. For example, if the node is in the critical path and is determined to be behind schedule, then the performance of the node is increased. Alternatively, if the node is determined to be ahead of schedule, or not in the critical path, the node's performance is potentially decreased without affecting the processing time of a given workload. To determine if a node is ahead or behind a schedule, the power management algorithm compares the current progress of the node with the minimum progress of the cluster. A threshold is also be used in some embodiments. If the progress is less than the minimum progress plus a first threshold, then the node is considered to be in the critical path and the node is boosted. On the other hand, if the progress is greater than the maximum progress minus a second threshold, then the node is not considered to be a critical node and its configuration is reduced in order to save power.

Referring now to FIG. 5, one embodiment of a method 500 which is executed by a node is shown. Pseudo code 500 is used to illustrate the method which is used by a node to update local information concerning maximum and minimum progress across the cluster. As such, the pseudo code represents software that could be used to implement the method. Alternatively, hardware (e.g., progress determining circuitry) is used to implement the method of FIG. 5. Accordingly, any combination of hardware and/or software is used for implementing the method of FIG. 5. As shown in the example, each node keeps track of its current progress (current_progress in code 500) on the current task the node is performing for the current phase of the workload being executed by the multi-node cluster.

At various times as the node is performing its task, the node compares its current progress (current_progress) to the maximum progress (max_progress) and minimum progress (min_progress) indicated for the cluster. In one embodiment, the node stores indications of the maximum and minimum progress in a table (e.g., table 400 of FIG. 4). If the current progress of the node is greater than the minimum progress stored in the table and the node identifier (ID) of the node is equal to the critical node identified in the table, then the minimum progress field of the table is updated with the current progress of the node. If the current progress of the node is greater than the maximum progress stored in the table, then the fastest node identified in the table is updated with the ID of the node and the maximum progress identified in the table is updated with the current progress of the node. It is noted that a timestamp field of the table is also updated in some embodiments when the minimum progress field or the maximum progress field of the table is updated.

It is noted that the sample code 500 shown in FIG. 5 is merely one example of pseudo code which is utilized by a node to update the node's local copy of the cluster progress table. In other embodiments, other types of sample code are utilized to update the node's snapshot of the cluster progress table.

Turning now to FIG. 6, one embodiment of a method for exchanging progress information between nodes is shown. In the example, pseudo code is presented that generally represents functionality provided by software. Alternatively, the logic presented in FIG. 6 is implemented in hardware, such as exchange progress circuitry, or a combination of hardware and software. Sample code 600 in FIG. 6 is an example of pseudo code which is executed for exchanging cluster progress information between nodes. To exchange cluster progress, a current node randomly selects a group ('S') of 'g' nodes from the cluster to exchange cluster progress information. For the purposes of this discussion, it is assumed that the current node is node 'A'. In various embodiments, the current node is passed as an argument to the exchange_progresses( ) method, or it is determined by some other context within which the method 600 executes. For each node 'B' in the group of nodes 'S', then if node 'A' and node 'B' both identify the same node as the critical node, then the minimum progress of the two nodes which is more advanced (greater) is set as the minimum progress for both nodes. For example, if both node 'A' and node 'B' have node 'C' identified as the critical node, and node 'B' has the minimum progress recorded as 30% while node 'A' has the minimum progress recorded as 20%, then the minimum progress of node 'A' is set to 30% as it is assumed to be a more up-to-date progress report. Exchanging cluster information (progress) further involves synchronizing the minimum progress in the tables of nodes 'A' and 'B'. If the minimum progress stored in the table of node 'A' is less than or equal to the minimum progress stored in the table of node 'B', then the minimum progress and ID of the critical node is copied from node 'A' to node 'B' as the critical node identified is deemed "more critical" given that it has less progress. If the minimum progress stored in the table of node 'A' is greater than the minimum progress stored in the table of node 'B', then the minimum progress and ID of the critical node is copied from node 'B' to node 'A'.

In addition to the above, the illustrated embodiment shows that exchanging progress information also includes synchronizing the maximum progress in the tables of nodes 'A' and 'B'. If the maximum progress stored in the table of node 'A' is greater than or equal to the maximum progress stored in the table of node 'B', then the maximum progress and ID of the fastest node is copied from node 'A' to node 'B'. Otherwise, if the maximum progress stored in the table of node 'A' is less than the maximum progress stored in the table of node 'B', then the maximum progress and ID of the fastest node is copied from node 'B' to node 'A'.

In one embodiment, the cluster progress snapshot includes the information shown in table 400 of FIG. 4. The cluster progress snapshot is appended to a message, or alternatively, the cluster progress snapshot is sent by itself. Different nodes of the cluster have different snapshots of the cluster progress at the same time. This is due to the nodes only exchanging messages periodically and with a subset of the nodes of the cluster. However, over time, as more messages are shared between nodes, the cluster progress snapshots of the different nodes converge to a common snapshot. In some embodiments, the system includes a heartbeat mechanism for monitoring the health of nodes in the system. In such an embodiment, each node is configured to periodically generate a message (a "heartbeat") the serves to indicate that the node is up and running. These heartbeat messages are then conveyed between nodes so that each of the nodes monitors the health of other nodes in the system. For example, each node is coupled to convey a heartbeat message to a designated subset of nodes. In some embodiments, such a heartbeat mechanism is leveraged to also share progress information between nodes. For example, at or near the time a heartbeat message is to be generated, a node goes through a process for sharing progress information as described above and report progress information along with the heartbeat message. These and other embodiments are possible and are contemplated.

Figure 7:
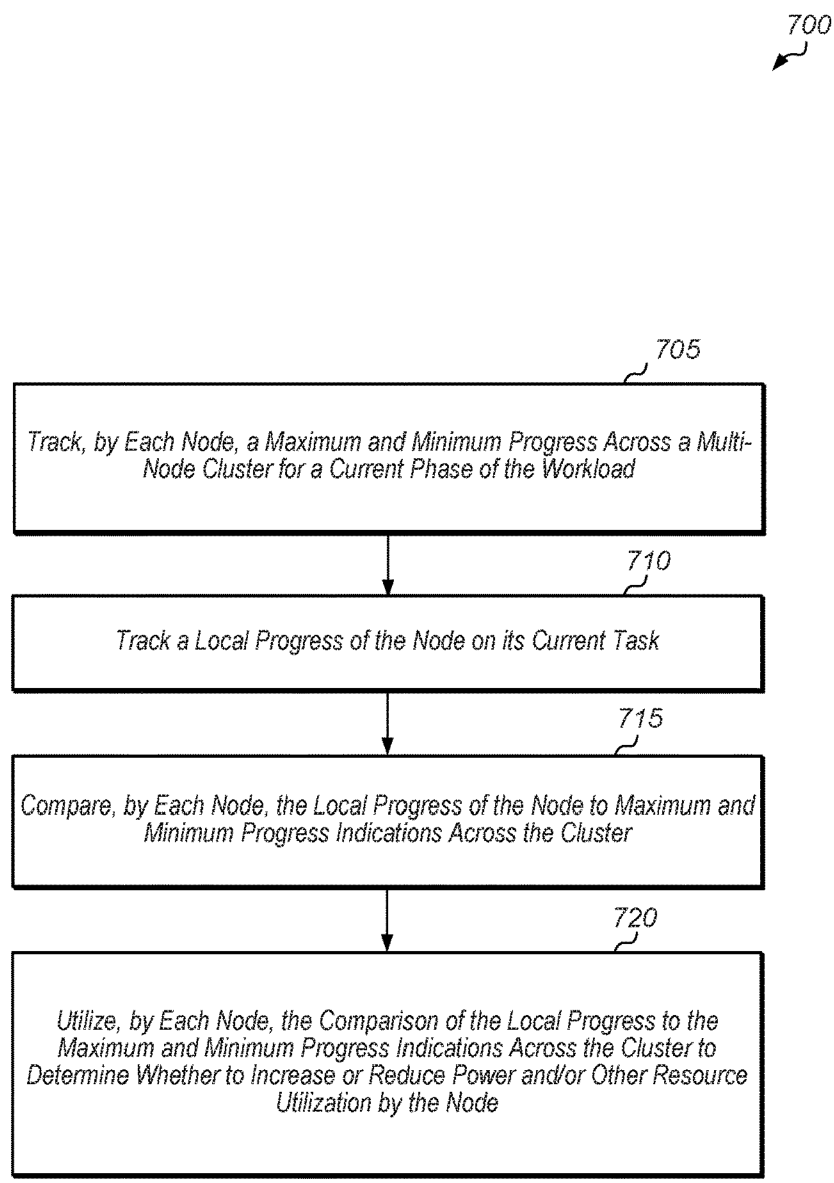
FIG. 7 is a generalized flow diagram illustrating one embodiment of a method for managing the power allocation of nodes.

Referring now to FIG. 7, one embodiment of a method 700 for managing the power allocation of nodes is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 700.

Each node of a multi-node cluster tracks a maximum and minimum progress across the cluster for a current phase of the workload (block 705). In one embodiment, tracking the maximum and minimum progress across the cluster for a current phase of the workload comprises maintaining a table with a local snapshot of the progress of the fastest node and the progress of the slowest node ("critical node") of the cluster.

Each node also tracks a local progress of the node on its current task (block 710). Each node compares the local progress of the node to the maximum and minimum progress across the cluster (block 715). Each node utilizes the comparison of the local progress to the maximum and the minimum progress across the plurality of nodes of the cluster to determine whether to increase or reduce an amount of power allocated to the node (block 720). For example, if the comparison indicates that the node is ahead of schedule, then the power allocated to the node is reduced. Otherwise, if the comparison indicates that the node is behind schedule, then the power allocated to the node is increased so that the node can catch up with the other nodes. After block 720, method 700 ends.

Figure 8:
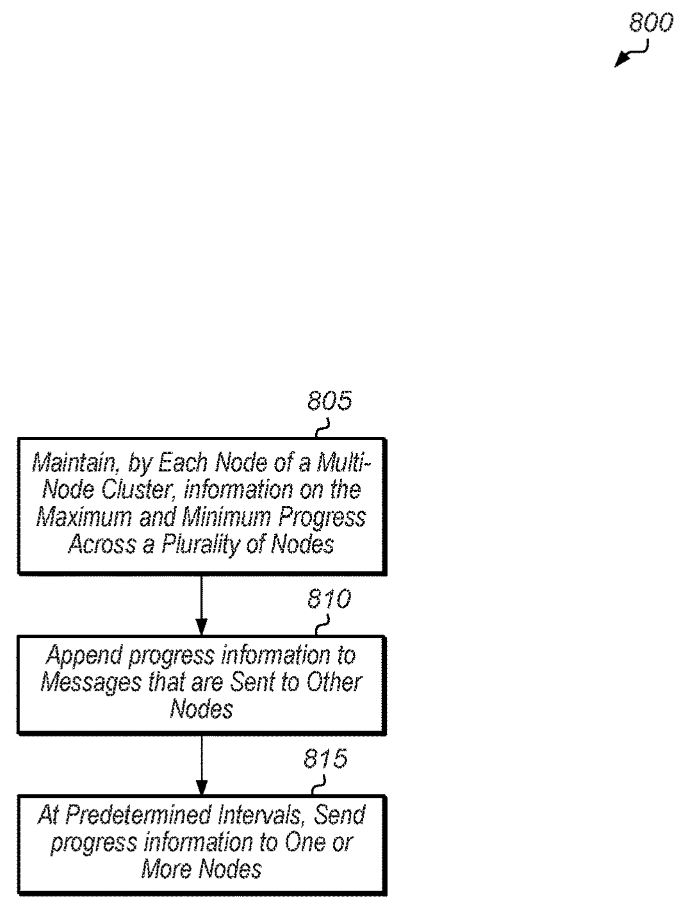
FIG. 8 is a generalized flow diagram illustrating another embodiment of a method for sharing work progress status across a multi-node cluster.

Turning now to FIG. 8, one embodiment of a method 800 for sharing work progress status across a multi-node cluster is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 800.

Each node of a multi-node cluster maintains a table of the maximum and the minimum progress across the plurality of nodes (block 805). In one embodiment, the table identifies a fastest node and a slowest node of the cluster for the current phase of the workload. Each node appends the table to messages that are sent to other nodes (block 810). At predetermined intervals, each node also sends the table to one or more nodes of the plurality of nodes (block 815). In one embodiment, the node randomly selects one or more nodes from the plurality of nodes and then the node sends the table to the randomly selected node(s). After block 815, method 800 ends.

Figure 9:
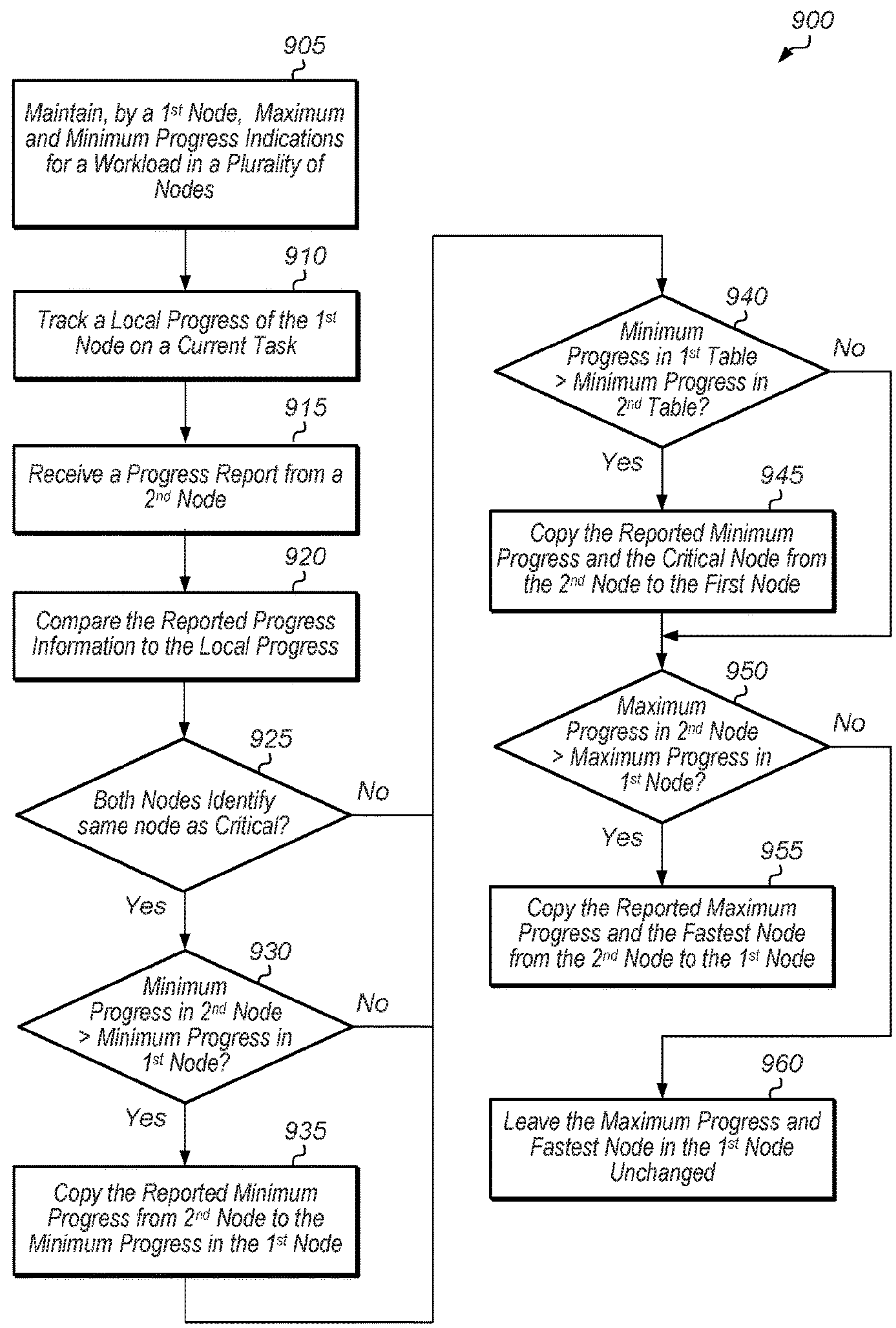
FIG. 9 is a generalized flow diagram illustrating one embodiment of a method for updating a cluster progress table.

Referring now to FIG. 9, one embodiment of a method 900 for updating a cluster progress table is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 900.

A first node of a multi-node cluster maintains a first table tracking maximum and minimum progress across the plurality of nodes for a current phase of a workload (block 905). The first node also tracks a local progress of the first node on its current task (block 910). While performing its current task, the first node receives a second table from a second node (block 915).

In response to receiving the second table, the first node compares the second table to the first table maintained by the first node (block 920). If the critical node in the second table is the same as the critical node in the first table (conditional block 925, "yes" leg), then the first node determines if the minimum progress in the second table is greater than the minimum progress in the first table (conditional block 930). If the minimum progress in the second table is greater than the minimum progress in the first table (conditional block 930, "yes" leg), then the first node copies the minimum progress from the second table to the minimum progress in the first table (block 935).

Next, the first node determines if the minimum progress in the first table is greater than the minimum progress in the second table (conditional block 940). If the minimum progress in the first table is greater than the minimum progress in the second table (conditional block 940, "yes" leg), then the first node copies the minimum progress and the critical node from the second table to the first table (block 945).

Next, the first node determines if the maximum progress in the second table is greater than the maximum progress in the first table (conditional block 950). If the maximum progress in the second table is greater than the maximum progress in the first table (conditional block 950, "yes" leg), then the first node copies the maximum progress and the fastest node from the second table to the first table (block 955). If the maximum progress in the second table is less than or equal to the maximum progress in the first table (conditional block 950, "no" leg), then the first node leaves the maximum progress and fastest node in the first table unchanged (block 960). After blocks 955 and 960, method 900 ends.

Figure 10:
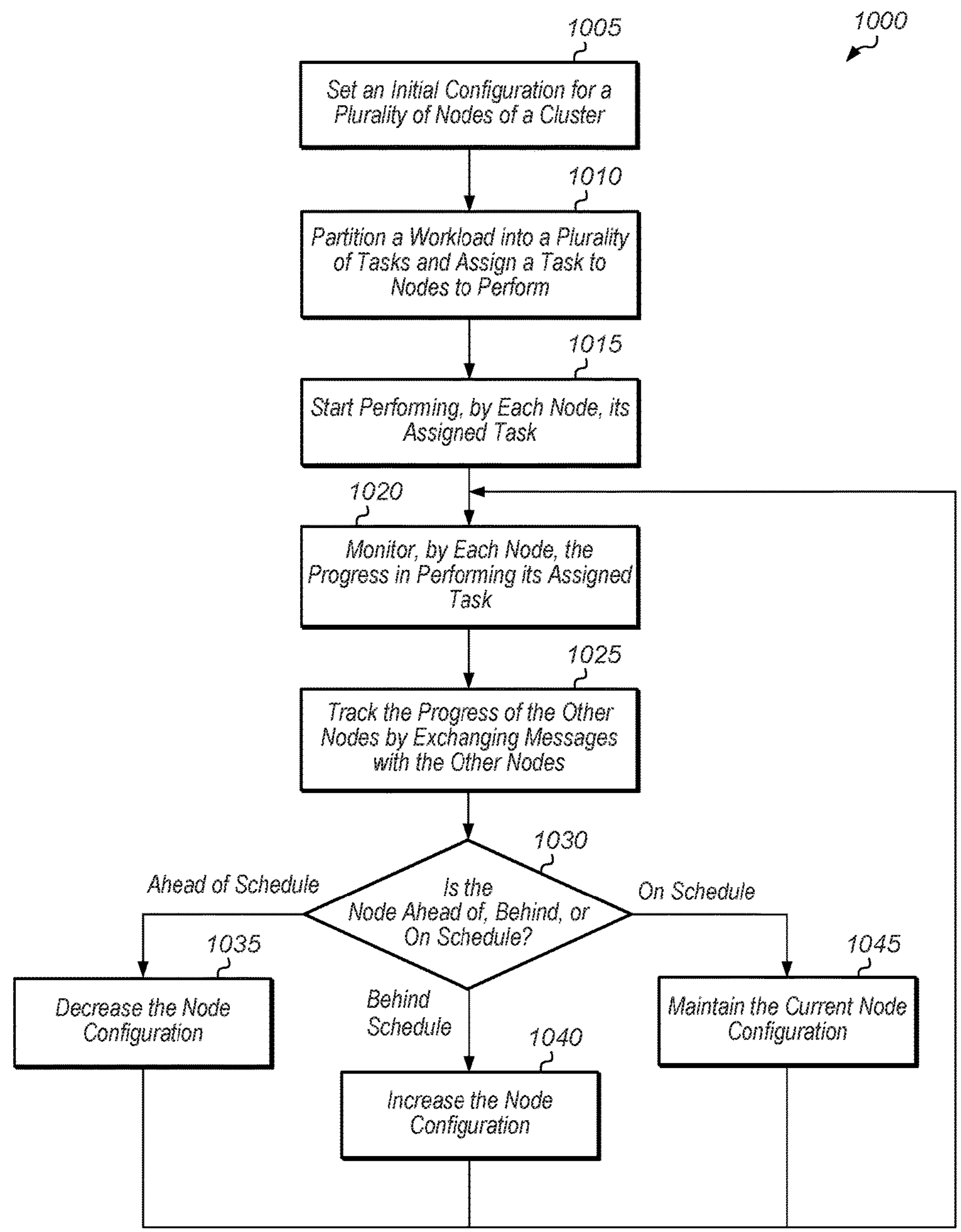
FIG. 10 is a generalized flow diagram illustrating one embodiment of a method for operating a multi-node cluster.

Turning now to FIG. 10, one embodiment of a method 1000 for operating a multi-node cluster is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 1000.

A multi-node cluster sets an initial configuration for a plurality of nodes of the cluster (block 1005). In one embodiment, the initial configuration for the plurality of nodes of the cluster involves allocating an amount of power to each node such that a cluster power cap is not exceeded. Next, a workload is partitioned into a plurality of tasks and each node is assigned a task of the workload to perform (block 1010).

Then, the nodes starts performing their assigned tasks (block 1015). While performing an assigned task, each node monitors its progress in performing its assigned task (block 1020). The node also tracks the progress of the other nodes by exchanging messages with the other nodes (block 1025). If the node is ahead of schedule (conditional block 1030, "ahead of schedule" leg), then the node configuration (or "performance parameters") is changed ("decreased") to (block 1035) such that the node reduces power (and/or other resource) consumption. While this causes the node to perform its task more slowly, it should not affect the performance of the overall cluster since the node is currently ahead of schedule.

In one embodiment, the node determines it is ahead of schedule if the node is within a first threshold of the maximum progress of the cluster. In another embodiment, the node determines it is ahead of schedule if the node is greater than the minimum progress of the cluster by a second threshold. In one embodiment, decreasing the node configuration constitutes decreasing the power allocated to the node. For example, decreasing the node configuration involves decreasing the number of active cores, decreasing the processor frequency and/or voltage, decreasing memory frequency, and/or decreasing the frequency and/or voltage of one or more components of the node.

If the node is behind schedule (conditional block 1030, "behind schedule" leg), then the node configuration is changed ("increased") (block 1040) such that the node consumes more power and/or other resources in order to perform its task more quickly. In one embodiment, the node determines it is behind schedule if the node is within a first threshold of the minimum progress of the cluster. In another embodiment, the node determines it is behind schedule if the node is not within a second threshold of the maximum progress of the cluster. In one embodiment, increasing the node configuration constitutes increasing the power allocated to the node. For example, increasing the node configuration involves increasing the number of active cores, increasing the processor frequency and/or voltage, increasing memory frequency, increasing an amount of memory allocated for use by a given task, and/or increasing the frequency and/or voltage of one or more components of the node.

If the node is on schedule (conditional block 1030, "on schedule" leg), then the node maintains its current node configuration (block 1045). In one embodiment, the node determines that it is on schedule if the progress of the node is at least a first threshold away from the minimum progress of the cluster and at least a second threshold away from the maximum progress of the cluster. After blocks 1035, 1040, and 1045, method 1000 returns to 1020 with each node continuing to monitor its progress in performing its assigned task.

It is noted that in one embodiment, method 1000 is repeated multiple times until all nodes finish their respective tasks, the cluster reaches a synchronization barrier, or some other event is detected to have occurred. At that point, method 1000 is restarted for a new task. It is noted that there is a "grace" period at the beginning of each task during which the nodes perform their tasks using an initial configuration. Then, after some time has elapsed to allow the nodes to track their performance and compare it to the performance of other nodes, then conditional block 1030 is initiated to determine whether to adjust the nodes' configuration.

In various embodiments, program instructions of a software application are used to implement the methods and/or mechanisms previously described. The program instructions may describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a computing network;
a plurality of nodes interconnected via the computing network; and
a cluster agent configured to map tasks of a workload to the plurality of nodes;
wherein each node of the plurality of nodes is configured to:
receive maximum and minimum progress indications from one or more nodes of the plurality of nodes for a workload;
track a local progress of the node on a current task of the workload;
utilize a comparison of the local progress to the received maximum and minimum progress indications to determine whether to change performance parameters of the node; and
increase a performance of the node by changing said performance parameters to cause an increase in an amount of power allocated to the node, responsive to determining the local progress of the node is within a first threshold of the minimum progress.

2. The system as recited in claim 1, wherein each node of the plurality of nodes is further configured to:
maintain a table of maximum and the minimum progress indications, wherein the table identifies a fastest node and a slowest node of the plurality of nodes for the workload; and
include information from the table in messages that are sent to one or more other nodes.

3. The system as recited in claim 2, wherein each node of the plurality of nodes is further configured to send the table to either:
one or more randomly selected nodes of the plurality of nodes; or
one or more predetermined nodes of the plurality of nodes.

4. The system as recited in claim 1, wherein responsive to determining a local progress of the node is within a second threshold of the maximum progress, each node of the plurality of nodes is configured to decrease an amount of power allocated to the node by changing said performance parameters.

5. The system as recited in claim 1, wherein each node of the plurality of nodes is further configured to:
receive a first table from a first node;
compare the first table to a local table maintained by the node;
modify data in the local table to update a maximum progress indication in the local table responsive to determining a maximum progress indication in the first table is greater than the maximum progress indication in the local table; and
modify data in the local table to update a minimum progress indication in the local table responsive to determining:
a minimum progress indication in the first table is less than the minimum progress of the local table; and
an identity of a slowest node in the local table is different from an identity of a slowest node in the first table.

6. The system as recited in claim 5, wherein each node of the plurality of nodes is further configured to:
copy an identity of a fastest node from the first table to the local table responsive to determining a maximum progress indication in the first table is greater than the maximum progress indication in the local table and responsive to determining an identity of a fastest node in the local table is different from an identity of the fastest node in the first table; and
copy an identity of a slowest node from the first table to the local table responsive to determining a minimum progress indication in the first table is less than the minimum progress indication in the local table and responsive to determining an identity of a slowest node in the local table is different from an identity of the slowest node in the first table.

7. A method comprising:
receiving, by a node in a computing system, maximum and minimum progress indications corresponding to a plurality of nodes in the computing system for a workload;
tracking, by the node, a local progress of the node on a current task of the workload;

utilizing a comparison of the local progress to the maximum and the minimum progress indications to determine whether to change performance parameters of the node; and increasing a performance of the node by changing said performance parameters to cause an increase in an amount of power allocated to the node, responsive to determining the local progress of the node is within a first threshold of the minimum progress.

8. The method as recited in claim 7, further comprising:

maintaining a table of the maximum and the minimum progress indications, wherein the table identifies a fastest node and a slowest node of the plurality of nodes for the workload; and including information from the table in messages that are sent to one or more other nodes.

9. The method as recited in claim 8, further comprising sending the table to either:

one or more randomly selected nodes of the plurality of nodes; or one or more predetermined nodes of the plurality of nodes.

10. The method as recited in claim 7, wherein changing said performance parameters comprises decreasing an amount of power allocated to the node responsive to determining a local progress of the node is within a second threshold of the maximum progress.

11. The method as recited in claim 7, further comprising:

receiving a first table from a first node;

comparing the first table to a local table maintained by the node;

modifying data in the local table to update the maximum progress indication in the local table responsive to determining a maximum progress in the first table is greater than the maximum progress indication in the local table; and modifying data in the local table to update the minimum progress indication in the local table responsive to determining a minimum progress indication in the first table is less than the minimum progress indication in the local table and responsive to determining an identity of a slowest node in the local table is different from an identity of a slowest node in the first table.

12. The method as recited in claim 11, further comprising:

copying an identity of a fastest node from the first table to the local table responsive to determining a maximum progress indication in the first table is greater than the maximum progress indication in the local table and responsive to determining an identity of a fastest node in the local table is different from an identity of the fastest node in the first table; and copying an identity of a slowest node from the first table to the local table responsive to determining a minimum progress indication in the first table is less than the minimum progress indication in the local table and responsive to determining an identity of a slowest node in the local table is different from an identity of the slowest node in the first table.

13. A non-transitory computer readable storage medium comprising program instructions, wherein the program instructions are executable to:

receive maximum and minimum progress indications from one or more nodes of the plurality of nodes for a workload;

track a local progress of the node on a current task of the workload;

utilize a comparison of the local progress to the received maximum and minimum progress indications to determine whether to change performance parameters of the node; and increase a performance of the node by changing said performance parameters to cause an increase in an amount of power allocated to the node, responsive to determining the local progress of the node is within a first threshold of the minimum progress.

14. The non-transitory computer readable storage medium as recited in claim 13, wherein the program instructions are further executable to:

maintain a table of the maximum and the minimum progress indications corresponding to the plurality of nodes, wherein the table identifies a fastest node and a slowest node of the plurality of nodes for the workload; and include information from the table in messages that are sent to one or more other nodes.

15. The non-transitory computer readable storage medium as recited in claim 14, wherein the program instructions are further executable to send the table to either:

one or more randomly selected nodes of the plurality of nodes; or one or more predetermined nodes of the plurality of nodes.

16. The non-transitory computer readable storage medium as recited in claim 13, wherein changing said performance parameters comprises decreasing an amount of power allocated to the node responsive to determining a local progress of the node is within a second threshold of the maximum progress.

17. The non-transitory computer readable storage medium as recited in claim 13, wherein the program instructions are further executable to:

receive a first table from a first node;

compare the first table to a local table maintained by the node;

modify data in the local table to update the maximum progress indication in the local table responsive to determining a maximum progress indication in the first table is greater than the maximum progress indication in the local table; and modify data in the local table to update the minimum progress of the local table responsive to determining a minimum progress indication in the first table is less than the minimum progress indication in the local table and responsive to determining an identity of a slowest node in the local table is different from an identity of a slowest node in the first table.

* * * * *